United States Patent
Böcker et al.

(10) Patent No.: US 10,344,895 B2
(45) Date of Patent: Jul. 9, 2019

(54) LEAD-THROUGH DEVICE FOR A WALL

(71) Applicant: TI AUTOMOTIVE TECHNOLOGY CENTER GMBH, Rastatt (DE)

(72) Inventors: Albert J. Böcker, Ettlingen (DE); Alex Ehler, Rastatt (DE); Patrick Gmünd, Karlsruhe (DE); Peter Grauer, Steinweiler (DE); Gerrit Michaelis, Friesenheim (DE)

(73) Assignee: TI Automotive Technology Center GmbH, Rastatt (DE)

( * ) Notice: Subject to any disclaimer, the term of this patent is extended or adjusted under 35 U.S.C. 154(b) by 131 days.

(21) Appl. No.: 15/328,819

(22) PCT Filed: Jun. 5, 2015

(86) PCT No.: PCT/EP2015/062546
§ 371 (c)(1),
(2) Date: Jan. 24, 2017

(87) PCT Pub. No.: WO2016/012145
PCT Pub. Date: Jan. 28, 2016

(65) Prior Publication Data
US 2017/0211724 A1    Jul. 27, 2017

(30) Foreign Application Priority Data
Jul. 25, 2014    (DE) .................. 10 2014 214 705

(51) Int. Cl.
*F16L 5/12*    (2006.01)
*F16L 5/06*    (2006.01)
(Continued)

(52) U.S. Cl.
CPC ............... *F16L 5/12* (2013.01); *B60K 15/01* (2013.01); *B60K 15/04* (2013.01); *F16L 5/06* (2013.01); *B60K 2015/03493* (2013.01)

(58) Field of Classification Search
CPC ....... F16L 5/02; F16L 5/06; F16L 5/12; F16L 27/1021; B60K 15/01; B60K 15/04; B60K 2015/03493
(Continued)

(56) References Cited

U.S. PATENT DOCUMENTS

| 5,295,851 A | 3/1994 | Bawa et al. |
| 5,704,400 A | 1/1998 | Eldridge |

(Continued)

FOREIGN PATENT DOCUMENTS

DE    4234262 A1    4/1994

OTHER PUBLICATIONS

International Search Report dated Aug. 5, 2015 for PCT/EP2015/062546.

*Primary Examiner* — Greg Binda
*Assistant Examiner* — Zachary T Dragicevich
(74) *Attorney, Agent, or Firm* — Brinks Gilson & Lione

(57) ABSTRACT

A lead-through device for a wall comprising first and second pipe fitting elements. A supporting element is connected to the second pipe fitting element by way of an elastic portion which allows limited displacement of the supporting element in relation to the second pipe fitting element at least in the direction of a longitudinal center axis. The primary sealing toward the outside is achieved by the sealing element borne by the flange of the first pipe fitting element.

12 Claims, 2 Drawing Sheets

(51) Int. Cl.
*B60K 15/01* (2006.01)
*B60K 15/04* (2006.01)
*B60K 15/03* (2006.01)

(58) Field of Classification Search
USPC ............... 285/57, 136.1, 139.1, 139.2, 201
See application file for complete search history.

(56) References Cited

U.S. PATENT DOCUMENTS

| | | | | |
|---|---|---|---|---|
| 5,704,656 A | * | 1/1998 | Rowe | F16L 5/02 |
| 5,967,567 A | * | 10/1999 | Nordstrom | 285/139.1 |
| 5,971,444 A | * | 10/1999 | Hawkins | F16L 5/06 |
| | | | | 285/139.2 X |
| 2005/0062283 A1 | * | 3/2005 | Hawkinson | F16L 5/06 |
| | | | | 285/139.1 |
| 2006/0253971 A1 | * | 11/2006 | Colin | F16L 5/06 |
| 2013/0240536 A1 | * | 9/2013 | Feichtinger | B60K 15/04 |

* cited by examiner

LEAD-THROUGH DEVICE FOR A WALL

CROSS REFERENCE TO RELATED APPLICATIONS

This application is the National Stage of International Application No. PCT/EP2015/062546, filed Jun. 5, 2015, which claims the benefit of German Patent Application No. 10 2014 214 705, filed Jul. 25, 2014, the entire contents of each of which are incorporated herein by reference.

BACKGROUND

The invention relates to a lead-through device for a wall, having a first and a second pipe fitting element, which can be connected to one another through a through-passage in the wall, wherein the first pipe fitting element has a flange, which bears a sealing element which, in the connected state of the two pipe fitting elements, abuts with fluid-sealing action against a wall portion adjacent to the through-passage in the wall, and wherein the second pipe fitting element has arranged on it a supporting element which, in the connected state of the two pipe fitting elements, is supported on the other side of the wall, as seen with respect to the sealing element of the first pipe fitting element.

In a tank or container having a wall, access is frequently required to the interior of the tank or container in order for example for a fluid, which may be liquid or gaseous, to be channeled into or out of the same. For this purpose, lead-through devices of the type mentioned above are known. It is regularly necessary for the lead-through device to provide for a connection between the one side and the other side of the wall which is fluid-tight toward the outside. This is important, in particular, for fuel tanks, in particular plastic fuel tanks, in which, for example during refueling, liquid fuel is introduced and from which, for example for venting purposes, gaseous fuel vapors are routed out. While it is therefore the case that, on the one hand, liquid fuel should be introduced into the tank and, on the other hand, gaseous fuel should be routed out from the tank, strict emission standards stipulate that there should be no fuel vapors, or even liquid fuel, escaping. While this can be realized in a comparatively straightforward manner for the tank wall by way of a construction with a plurality of layers, and use being made of a layer which is impermeable to fuels, openings in the tank wall for lead-throughs are always critical.

A lead-through device of the type mentioned above is known from WO 2006/032672 A1. The supporting element there is designed in the form of a further flange which, like the flange on the first pipe fitting element, is connected rigidly to a tube body of the pipe fitting element. In the screwed-together state of the two pipe fitting elements, the two flanges abut against the wall, in surface contact therewith, wherein a respective sealing ring in a groove provided in the flanges is intended to provide for sealing. This does not take into account the fact that, over time, the wall undergoes expansion and shrinkage, and therefore permanent sealing of the screw connection, once established, is not ensured.

Based on this it is the object of the present invention to provide a lead-through device for a wall of the type mentioned above which straightforwardly ensures reliable and permanent sealing toward the outside.

The combination of features in patent claim 1 is proposed to achieve this object. Advantageous embodiments and developments of the invention result from the dependent claims.

SUMMARY

The invention is based, in particular, on the idea that it is possible to compensate for expansion and shrinkage of the wall by using an elastic element. According to the invention, therefore, the supporting element is connected to the second pipe fitting element by way of an elastic portion which allows limited displacement of the supporting element in relation to the second pipe fitting element at least in the direction of a longitudinal center axis. The primary sealing toward the outside is achieved by the sealing element borne by the flange of the first pipe fitting element. In order for this sealing element to be able to perform its function, it is pressed against the first side of the wall by the supporting element on the other side of the wall. The elastic arrangement of the supporting element has to be effective at least in the direction in which expansion or shrinkage of the wall takes place, that is to say generally in the direction of a longitudinal center axis of the second pipe fitting element. Furthermore, it may be advantageous if the elastic connection also has other degrees of freedom, for example in order to absorb forces acting laterally on the lead-through device, without compromising the sealing action in the process.

In a preferred embodiment of the invention, the first pipe fitting element has a first tube body and the second pipe fitting element has a second tube body, wherein for example one of the pipe fitting elements, in the region of its tube body, has an externally threaded portion and the other pipe fitting element, in the region of one end of its tube body, has an internally threaded portion, wherein the externally threaded portion and the internally threaded portion can be screwed to one another in order to connect the two pipe fitting elements. It is preferable for the tube body of the first pipe fitting element to have the external thread and for the tube body of the second pipe fitting element to have the internal thread, since this give rise to a more advantageous sealing arrangement of the device. As an alternative, it is also possible for the two pipe fitting elements to be connected to one another via a bayonet mechanism or a latching mechanism, which can facilitate assembly. It is further conceivable for the two pipe fitting elements to be connected to one another permanently by means of adhesive or welding.

In an advantageous development of the invention, the supporting element of the second pipe fitting element is designed in the form of an annular element which encloses the tube body on the outside, the supporting element therefore constituting a fluid-tight barrier. The elastic connection to the tube body of the pipe fitting element can be achieved, for example, by the supporting element of the second pipe fitting element being connected to the tube body of the pipe fitting element by an annular bead. It is also conceivable to arrange an elastomeric element between the supporting element and the pipe fitting element or to have some other elastic connection means. The connection between the supporting element and the tube body, said connection being elastic in particular in the axial direction of the tube body, provides for a constant contact pressure of the supporting element against the wall, and thus also of the sealing element, located opposite, against the wall, when the thickness of the wall undergoes slight expansion and shrinkage in practice on account of differences in temperature or as a result of fuel being absorbed into the wall and desorbed from the wall.

In a further configuration of the invention, the supporting element of the second pipe fitting element may advantageously have an end surface which is directed toward the wall and on which a wedge-shaped rib is arranged. This wedge-shaped rib, as the two pipe fitting elements are being connected to one another, is pressed into the material of the wall and thus ensures, on the one hand, additional sealing in the manner of a knife-edge seal and, on the other hand, an increase in the mechanical stability, in which case the lead-through device cannot slip in relation to the wall when subjected to mechanical loading.

It is preferable for both the two pipe fitting elements and the wall each to consist of a plastic, wherein the wall can consist of at least two layers of plastics, one layer being impermeable to liquid or gaseous fuel. Possible materials which can be used here are, in particular, HDPE (high density polyethylene), forming the basic material, and EVOH (ethylene-vinyl alcohol copolymer), forming a barrier material. The pipe fitting elements can consist of a rigid plastic, such as POM (polyoxymethylene) or PA (polyamide). The sealing element is designed preferably in the form of an O-ring arranged in a groove of the flange, but may also be an X-ring or a sealing element configured in some other way.

BRIEF DESCRIPTION OF THE DRAWINGS

The invention will be explained in more detail hereinbelow with reference to an embodiment illustrated schematically in the drawing, in which.

DETAILED DESCRIPTION

Figure 1:
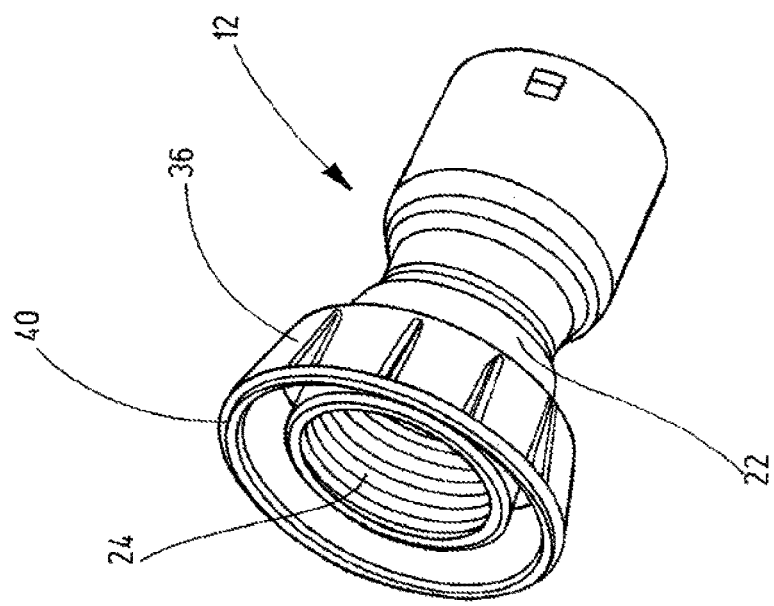
FIG. 1 shows a perspective view of the two pipe fitting elements of the lead-through device.
Figure 1:
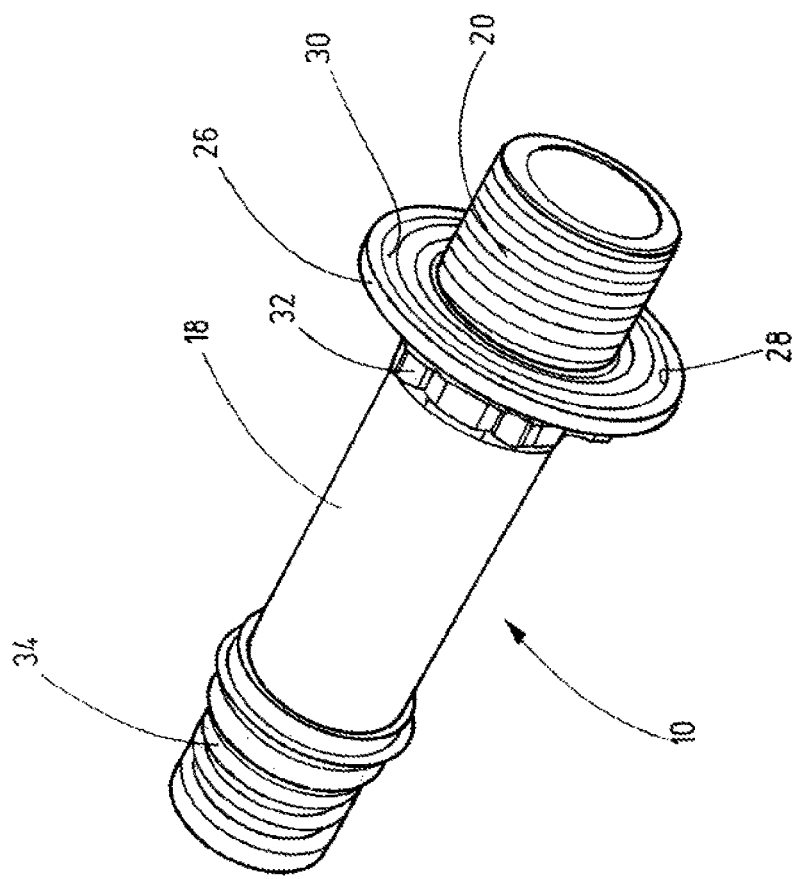
Figure 2:
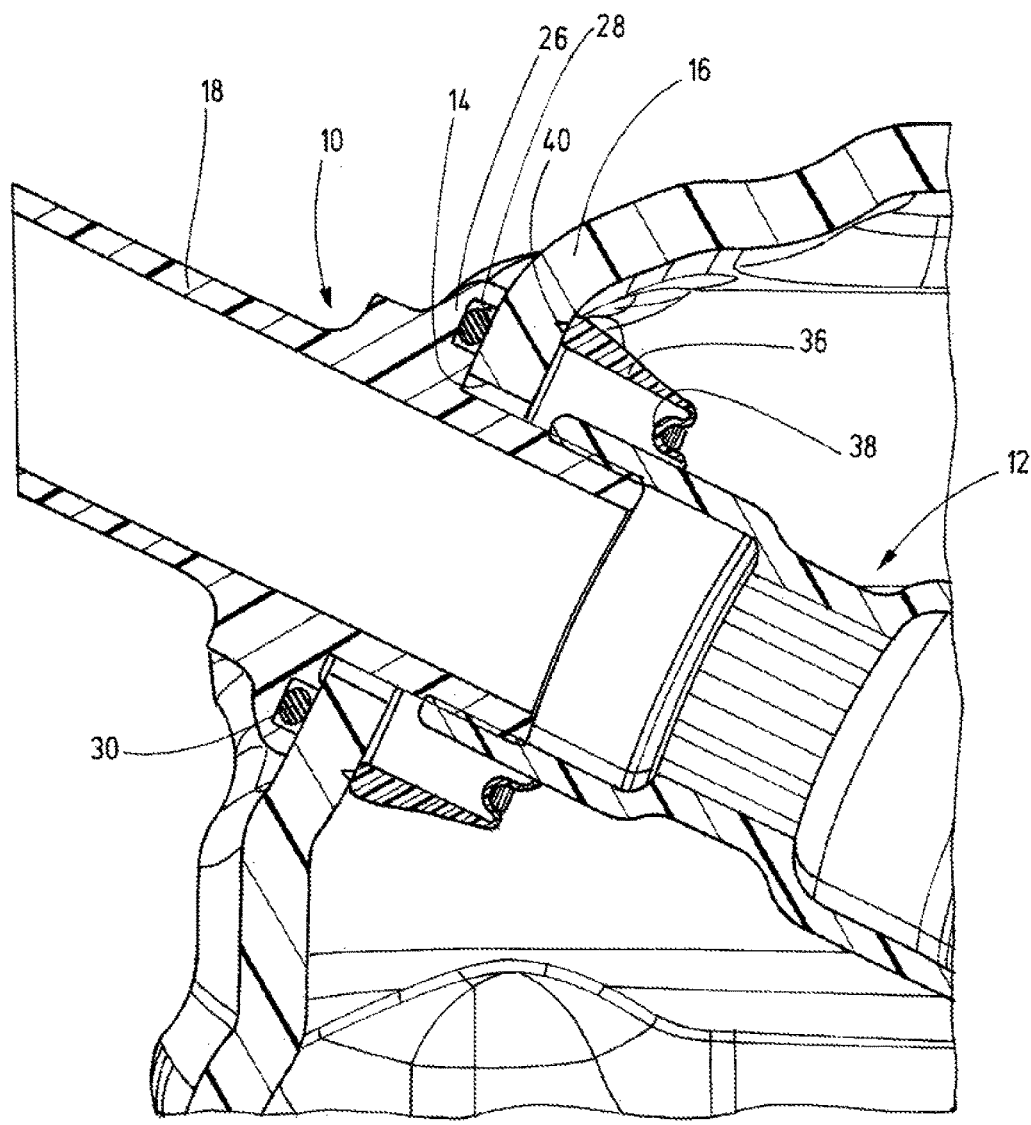
FIG. 2 shows the two pipe fitting elements according to FIG. 1 in an arrangement in which they are connected to one another through an opening in a wall.

The lead-through device which is illustrated in FIG. 1, and is designed in the form of a refueling lead-through for a plastic fuel tank, comprises a first pipe fitting element 10 and a second pipe fitting element 12, which can be connected to one another through a through-passage 14 in a wall 16 (FIG. 2) of the tank and, in the process, provide access to the tank interior, said access being fluid-tight toward the outside. For this purpose, the first pipe fitting element 10 has a first tube body 18 with an external thread 20 in the region of its one end and the second pipe fitting element 12 has a second tube body 22 with a complementary internal thread 24 in the region of its end which is assigned to the first pipe fitting element. The first pipe fitting element 10 also has a flange 26, which encloses the tube body 18 at a distance from the external thread 20 and has a side which is directed toward the wall 16 and has an O-ring sealing element 30 disposed there in a groove 28. A structure 32 for the attachment of a tool for screwing the two pipe fitting elements 10, 12 to one another is provided on the opposite side of the flange. In a second end region, the first tube body 18 has a connection portion 34 for connection of a connecting tube which leads to a tank filler neck.

The second pipe fitting element 12 has a supporting element 36 which annularly encloses that portion of the second tube body 22 which has the internal thread 24 and also, in the joined-together state of the two pipe fitting elements 10, 12, is supported on the wall 16 and provides for the sealing element 30 to be pressed against the other side of the wall 16. The flange 26 of the first pipe fitting element 10 is typically arranged on the outside of the tank having the wall 16, and the supporting element 36 is typically arranged on the inside of the tank. The supporting element 36 is connected elastically to the second tube body 22 of the second pipe fitting element 12 by means of a bead 38, and this provides for a certain amount of displacement of the supporting element 36 in relation to the tube body in the direction of a longitudinal center axis of the tube body, said displacement ensuring a predetermined constant contact pressure of the sealing element 30 against the wall 16 when the latter expands or shrinks slightly, for example, on account of temperature fluctuations or in particular absorption of fuel into the wall 16 and desorption of fuel from the same. The flange 26 and the supporting element 36 are each arranged at a distance from the ends of the pipe fitting elements, and therefore connecting portions which project axially beyond the flange 26 and the supporting element 36 in each case remain. In order to prevent fuel from diffusing outward through the wall 16, the latter may be formed from a plurality of layers, at least one of which is impermeable to fuel. On an end surface which abuts against the wall 16, the supporting element has a V-shaped rib 40, which presses in a knife-like manner into the wall 16, which consists, in comparison, of relatively soft plastic material, typically HDPE. This results in the supporting element 36 being reliably retained on the wall 16, and this makes it difficult for the lead-through device to slip in relation to the wall 16 when subjected to mechanical loading and an additional seal is created towards the outside of the tank.

Figure 3:
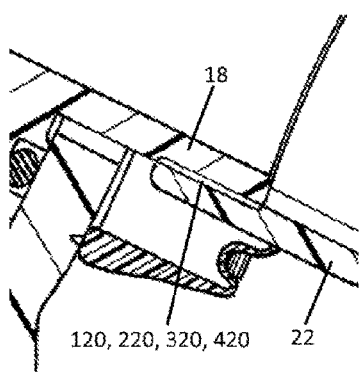
FIG. 3 shows an enlarged, partially cut-away, view of alternate embodiments of the two pipe fitting elements similar to FIG. 2.

As an alternative, and as shown in FIG. 3, it is also possible for the two pipe fitting elements to be connected to one another via a bayonet mechanism 120 or a latching mechanism 220, which can facilitate assembly. It is further conceivable for the two pipe fitting elements to be connected to one another permanently by means of adhesive 320 or welding 420.

To summarize: A lead-through device for a wall 16, having a first and a second pipe fitting element 10, 12, which can be connected to one another through a through-passage 14 in the wall 16, wherein the first pipe fitting element 10 has a flange 26, which bears a sealing element 30 which, in the connected state of the two pipe fitting elements 10, 12, abuts with fluid-sealing action against a wall portion adjacent to the through-passage 14 in the wall 16, and wherein the second pipe fitting element 12 has arranged on it a supporting element 36 which, in the connected state of the two pipe fitting elements 10, 12, is supported on the other side of the wall 16, as seen with respect to the sealing element 30 of the first pipe fitting element 10. In order to achieve reliable and permanent sealing of the device in relation to a tank interior enclosed by the wall 16, in particular an interior of a plastic fuel tank, the invention proposes that the supporting element 36 should be connected to the second pipe fitting element 12 by way of an elastic portion which allows limited displacement of the supporting element 36 in relation to the second pipe fitting element 12 at least in the direction of a longitudinal center axis of the pipe fitting element 12.

The invention claimed is:

1. A lead-through device for a wall comprising:

a first and a second pipe fitting element, which are adapted to be connected to one another through a through-passage in the wall, wherein the first pipe fitting element has a first tube body and the second pipe fitting element has a second tube body, the first and second tube bodies connected together in a connected state of the two pipe fitting elements;

wherein the first pipe fitting element has a flange projecting radially from the first tube body and carrying a sealing element which, in the connected state of the two pipe fitting elements, abuts with fluid-sealing action against a portion of the wall adjacent to the through-passage in the wall;

wherein the second pipe fitting element has arranged on an exterior of the second tube body a supporting element which, in the connected state of the two pipe fitting elements, is supported on the other side of the wall with respect to the sealing element of the first pipe fitting element; and wherein the supporting element is connected to the second tube body of the second pipe fitting element by way of an elastic portion which allows limited displacement of the supporting element in relation to the second pipe fitting element at least in the direction of a longitudinal center axis of the pipe fitting element.

2. The device as claimed in claim 1, wherein one of the pipe fitting elements, in the region of one end of its tube body, has an externally threaded portion and the other pipe fitting element, in the region of one end of its tube body, has an internally threaded portion, wherein the externally threaded portion and the internally threaded portion can be screwed to one another in order to connect the two pipe fitting elements.

3. The device as claimed in claim 2, wherein the tube body of the first pipe fitting element has the external thread and the tube body of the second pipe fitting element has the internal thread.

4. The device as claimed in claim 1, wherein the two pipe fitting elements can be connected to one another via a bayonet mechanism or a latching mechanism.

5. The device as claimed in claim 1, wherein the two pipe fitting elements are connected to one another by means of adhesive or welding.

6. The device as claimed in claim 1, wherein the supporting element is designed in the form of an annular element which encloses the tube body of the second pipe fitting element on the outside.

7. The device as claimed in claim 1, wherein the elastic portion connecting the supporting element to the second pipe fitting element is designed in the form of an annular bead.

8. The device as claimed in claim 1, wherein the supporting element has an end surface directed toward the wall on which a wedge-shaped rib is arranged.

9. The device as claimed in claim 1, wherein the two pipe fitting elements and the supporting element consists of a plastic selected from polyoxymethylene and polyamide.

10. The device as claimed in claim 1, wherein the sealing element, which is borne by the flange of the first pipe fitting element, is an O-ring arranged in a groove of the flange.

11. The device as claimed in claim 1, wherein the first pipe fitting element has a structure for the attachment of a tool on a side of the flange which is directed away from the wall.

12. The device as claimed in claim 1, wherein the supporting element abuts the other side of the wall with respect to the sealing element in the connected state of the two pipe fitting elements.

* * * * *